United States Patent
Ackerman

(10) Patent No.: US 6,207,085 B1
(45) Date of Patent: Mar. 27, 2001

(54) HEAT EXPANDABLE COMPOSITIONS

(75) Inventor: Eva Ackerman, Houston, TX (US)

(73) Assignee: The Rectorseal Corporation, Houston, TX (US)

( * ) Notice: Subject to any disclaimer, the term of this patent is extended or adjusted under 35 U.S.C. 154(b) by 0 days.

(21) Appl. No.: 09/283,349

(22) Filed: Mar. 31, 1999

(51) Int. Cl.$^7$ .................................................. C09K 21/04
(52) U.S. Cl. ........................... 252/606; 252/602; 162/159
(58) Field of Search .................................... 252/606, 602, 252/62; 162/159; 422/179

(56) References Cited

U.S. PATENT DOCUMENTS

| | | | |
|---|---|---|---|
| 3,513,114 | 5/1970 | Hahn et al. .............................. 260/8 |
| 3,574,644 | 4/1971 | Olstowski et al. ..................... 106/15 |
| 3,955,987 | 5/1976 | Schaar et al. .................... 106/15 FP |
| 4,722,945 | * 2/1988 | Wood et al. ............................ 521/65 |
| 4,945,015 | * 7/1990 | Milner et al. ......................... 523/179 |
| 5,094,780 | 3/1992 | von Bonin ............................ 252/606 |
| 5,156,775 | 10/1992 | Blount ................................. 252/609 |
| 5,462,699 | 10/1995 | Montgomery ........................ 252/609 |
| 5,498,476 | * 3/1996 | Tucker et al. ......................... 428/343 |
| 5,523,059 | * 6/1996 | Langer ................................. 422/179 |
| 5,578,671 | * 11/1996 | Welna .................................. 524/443 |
| 5,721,281 | * 2/1998 | Blount .................................. 521/50 |
| 5,736,109 | * 4/1998 | Howorth et al. ..................... 422/179 |
| 5,830,319 | * 11/1998 | Landin ................................. 162/159 |
| 5,854,309 | * 12/1998 | Blount ................................. 523/179 |
| 5,942,561 | * 8/1999 | Okisaki et al. ...................... 523/179 |
| 5,968,669 | * 10/1999 | Liu et al. .......................... 428/537.1 |

FOREIGN PATENT DOCUMENTS

| | | | |
|---|---|---|---|
| 0256967B1 | 2/1988 | (EP) . | |
| 0302987B1 | 2/1989 | (EP) . | |
| 2 196010 | 4/1988 | (GB) .............................. C08L/27/06 |

OTHER PUBLICATIONS

Grant & Hackh's Chemical Dictionary, 5th Edition. p. 331. 1987.*

* cited by examiner

Primary Examiner—Maureen M. Wallenhorst
Assistant Examiner—LaToya I. Cross
(74) Attorney, Agent, or Firm—Locke Liddell & Sapp LLP

(57) ABSTRACT

A composition which, when subjected to heat, expands to form heat-insulating barriers comprises an expandable graphite, a fire retardant, and an inorganic intumescent filler such as clay dispersed in a resinous emulsion. Particularly desirable results are obtained with a fire retardant which is a $C_2$–$C_8$ alkyl diamine phosphate.

20 Claims, No Drawings

HEAT EXPANDABLE COMPOSITIONS

FIELD OF THE INVENTION

The invention relates to a composition which, when subjected to heat, expands to form heat-insulating barriers. The composition comprises expandable graphite, a fire retardant, resinous emulsion and optionally an intumescent inorganic filler. In addition, the composition may contain a surfactant as well as a defoamer. The invention further relates to a fire retardant heat-insulating barrier consisting of a flexible substrate onto which is coated the stated composition. Such barriers have particular application as a fire stop seal for door frame assemblies.

BACKGROUND OF THE INVENTION

Fire retardant, fire proofing, and even fire stopping materials and their method of production and use have been disclosed in the prior art. For example, U.S. Pat. No. 5,462,699 discloses a fire retardant composition to be applied to materials such as building materials and corrugated board materials. By using silica or silicate, water, and a surfactant, the composition of this patent may provide a fire retardant coating. This composition, however, does not offer desired intumescent qualities. Such properties are specifically desired for the sealing of door frames as well as in the wrapping of pipes.

Additionally, the production and use of intumescent compounds has been described in the prior art. For example EPO 0 256 967 discloses a process for the production of moldings by extrusion or injection molding of a mixture that contains polyvinyl chloride and a mixture of polyhydric alcohol, a polyamide compound, and a phosphate at temperatures of 140° C. or less. Unfortunately, this patent required the use of a polyvinyl chloride resin.

Additionally, EPO 0 302 987 disclosed the production of a thermoplastic mixture containing expandable graphite, a non-polyvinyl chloride polymer, and two of the following group consisting of phosphates, polyamide compounds, and polyhydric compounds at temperatures of 150° C. or less. This disclosure only teaches the formation of a thermoplastic mixture and requires either a polyamide compound or a polyhydric alcohol.

U.S. Pat. No. 5,094,780 discloses the use of expandable graphite in fire retardant intumescent moldings wherein the graphite containing materials are heated in molds to temperatures between 150° C. and 350° C. More suitable means for producing fire retardant materials and less expensive fire retardant compositions are desired.

SUMMARY OF THE INVENTION

The present invention overcomes the difficulties of the prior art by providing a composition which, when subjected to heat, expands to form a heat-insulating barrier. The composition contains an expandable graphite and a fire retardant, optionally with an inorganic intumescent filler, all of which is admixed with a resinous emulsion. The composition of the invention may be produced at room temperature.

The invention further relates to molding strips for providing fire-retardant barriers to doorways and pipes. Such strips may optionally include a flexible substrate. The substrate may be wax paper, mineral wool, artificial fiber ribbons such as tetrahydrofuran fibers and aromatic amide fibers, polyethylene film, polypropylene film, polyurethane film or a polyester film. Onto the substrate is extruded, at room temperature, the resinous emulsion composition. The resulting fire stopping intumescent strips may be applied to door frames. In addition, the molding strips of the invention may be used to enclose pipes or other points of vulnerability in order to aid in the prevention of penetration of fire and/or smoke by intumescing and sealing off available pathways.

DETAILED DESCRIPTION OF PREFERRED EMBODIMENTS

The composition of the invention expands upon an exposure to heat, thereby creating a seal in the spread of fire and/or smoke. The composition consists of a resinous emulsion into which is admixed an expandable graphite and a fire retardant agent. In an alternative embodiment, an inorganic intumescent filler may be used in conjunction with the fire retarding agent.

Examples of emulsions for use in the invention are acrylic emulsions, polyvinyl acetate emulsions, silicone emulsions, and styrene butadiene emulsions. In one embodiment of the invention, a resinous aqueous emulsion of a polyvinyl acetate may be used. In addition to aqueous emulsions, the resinous emulsion for use in the composition of the invention may consist of emulsions of polymers within an organic solvent, such as hydrocarbons, like xylene and toluene. In addition, keto alcohols or similar co-solvents can be used. In a preferred embodiment, diacetone alcohol co-solvent is used in combination with water. In such instances, between about 0.5 to about 10 weight percent, preferably less than one weight percent of the composition prior to extrusion is co-solvent.

The composition of the invention (prior to extrusion) contains about 15 to about 90, preferably between about 25 to 90, most preferably between about 30 to about 60, weight percent of resinous emulsion.

Suitable styrene-butadiene polymers may be characterized as those polymers having from about 99 to about 65, preferably 99 to 80, weight percent of a $C_8$–$C_{12}$ vinyl or vinylidene aromatic monomer and the remainder being butadiene. The styrenic moiety can be optionally substituted with a $C_1$–$C_4$ alkyl or hydroxy alkyl radical or a chlorine or bromine atom.

Such polymers may further comprise one or more copolymerizable monomers containing a functional group. When present, the functional monomers are present in an amount from about 0.5 to about 6 weight percent. The functional monomers may be selected from the group consisting of (1) one or more $C_3$–$C_6$ ethylenically unsaturated carboxylic acids; (2) one or more amides of $C_3$–$C_6$ ethylenically unsaturated carboxylic acids, which amide may be substituted or unsubstituted at the nitrogen atom by a $C_1$–$C_4$ alkyl or hydroxy alkyl radical; (3) one or more $C_3$–$C_6$ ethylenically unsaturated aldehydes; and (4) one or more $C_1$–$C_6$ alkyl or hydroxy alkyl esters of $C_3$–$C_6$ ethylenically unsaturated carboxylic acids. Suitable $C_8$–$C_{12}$ vinyl aromatic monomers include styrene, alpha methyl styrene and chlorostyrene. Part of the aromatic monomer may be replaced by small amounts of an alkenyl nitrile such as acrylonitrile. Suitable conjugated diolefins include the aliphatic diolefins such as 1,3-butadiene, isoprene and their chlorinated homologues. Up to about half, preferably less than about 20 percent of the conjugated diolefin may be replaced with an ester of acrylic or methacrylic acid; or a vinyl ester of a saturated carboxylic acid. Suitable esters are those of acrylic or methacrylic acid such as methyl acrylate, methyl methacrylate, ethyl acrylate, ethyl methacrylate, hydroxyethyl acrylate, hydroxy ethyl methacrylate and the higher branched esters such as ethyl hexyl acrylate and ethyl hexyl methacrylate. Suitable vinyl esters include vinyl acetate.

The resin within the emulsion of the composition of the invention may further include commercially available acrylic resins such as those derived from acrylic acid, methacrylic acid, itaconic acid, fumaric acid, methyl acrylate, methyl methacrylate, ethyl acrylate, ethyl methacrylate, butyl acrylate, ethyl hexyl methacrylate, ethyl hexyl acrylate, acrylamide, methacrylamide, N-methylol acrylamide, N-methylol methacrylamide and/or acrolein.

The acrylate type polymers may further be characterized as polymers consisting of from about 60 to 99.5, preferably from about 85 to about 94.5 weight percent of a $C_1$–$C_8$ alkyl or hydroxy alkyl ester of acrylic and methacrylic acid, from about 10 to 40, preferably from about 5 to 15 weight percent of one or more monomers selected from the group consisting of $C_8$–$C_{12}$ vinyl or vinylidene aromatic monomers, which may be unsubstituted or substituted by a $C_1$–$C_4$ alkyl radical or a chlorine, or bromine atom, and a $C_3$–$C_6$ alkenyl nitriles and acrylic and methacrylic acid. The acrylate polymers may optionally further contain from about 0.5 to 10, preferably less than 5 weight percent, of a functional monomer other than a $C_{1-8}$ alkyl or hydroxy alkyl ester of acrylic or methacrylic acid. Suitable monomers were discussed above in relation to the styrene-butadiene type polymers.

The resin of the emulsion may further be an $C_1$–$C_8$ monoolefin-vinyl ester copolymer wherein the vinyl ester is an ethylenically unsaturated ester of a saturated carboxylic acid. Particularly preferred is vinyl acetate. Such copolymers typically comprise up to about 95 percent by weight of, preferably from about 5 to about 40 weight percent of a $C_{1-8}$ monoolefin. A $C_2$–$C_3$ monoolefin is preferred. The copolymer may further be derived from a hydroxy alkenyl ester of a $C_{1-8}$ saturated carboxylic acid. Lastly, the copolymer may optionally contain from about 0.5 to 10, preferably from about 0.5 to 5, weight percent of one or more of the functional monomers referenced above.

The emulsion for use in the invention may further comprise a silicone emulsion. Such emulsions are well known in the art. See, for example, U.S. Pat. Nos. 2,891,920; 3,294,725; 3,360,491; 2,702,276; 2,755,194; 4,194,988; 3,795,538, all of which are herein incorporated by reference.

The weight ratio of polymer:solvent in the emulsion is generally between 30:70 to about 70:30.

In a preferred embodiment, the resinous emulsion is characterized as having a glass transition temperature, $T_g$, below –40° C. In those instances, where the glass transition temperature of the emulsion is not below –40° C., a liquid plasticizer may be used. Suitable plasticizers for decreasing the glass transition temperature of the emulsion to an acceptable level are octyl epoxy soyate, epoxy tallates, epoxidized soybean oil, epoxidized linseed oil, triphenyl phosphate, neopentyl glycol dibenzoate, glycerine, vegetable oil and mineral oil. Typically, no more than 1 to about 10 weight percent of plasticizer, based on the weight of the resin, is needed.

Suitable for use as the fire retardant for use in the invention are conventional agents known in the art. Such agents include, but are not limited to, organic phosphates including an amine phosphate, a trialkyl phosphates such as tributyl phosphate and triethyl phosphate, halogenated alkyl phosphates such as tris (2,3-dibromopropyl) phosphate, ammonium phosphates including diammonium phosphate and ammonium polyphosphates, melamine phosphate, melamine ammonium polyphosphate, diammonium sulfate and blends thereof, such as a blend of monoammonium phosphate and diammonium phosphate having a nitrogen-to-phosphorus ratio of at least about 1.25 and a blend of monoammonium phosphate, diammonium sulfate and diammonium phosphate having a nitrogen-to-phosphorus ratio of at least 1.25.

Preferred flame retardants for use in the invention include amine/phosphorus containing salts. In general, these are amine salts of phosphoric acid or lower alkyl esters thereof Lower alkyl esters means that $C_1$–$C_8$ alkyl ester has been made of one or more sites on the phosphoric acid group. Most preferably, a $C_1$–$C_4$ alkyl esters are used and most preferably an ethyl ester or no ester group is used.

The amount of flame retardant in the composition prior to extrusion is between from about 1 to about 70, preferably between from about 10 to about 40, weight percent.

Further preferred are lower alkyl diamine phosphates, such as $C_2$–$C_8$ alkyl diamine phosphates, most preferably $C_2$–$C_4$ alkyl diamine phosphates. Due to its relatively high phosphorus content and since it can be obtained inexpensively from commercial sources, ethylene diamine phosphate is especially preferred.

Expandable graphites for use in the present invention are graphites of any type which are expandable on heating. They may be solid, swollen or already partly expanded and may expand, for example, by 10 to 800 percent by volume or more. Such expandable graphites are well known in the art. They are in general graphites in whose interstitial planes foreign atoms, ions or molecular groups are incorporated.

Preferred graphites are so-called $NO_x$ and $SO_x$ expandable graphites which can be prepared by the action of sulfuric or nitric acid on graphite, optionally in the presence of an oxidizing agent, such as hydrogen peroxide). The acid components of the resulting product are generally encapsulated within the graphite matrix. Suitable expandable graphites can also optionally be obtained by an electrochemical method. The composition of the invention prior to extrusion contains between from about 5 to about 95, preferably between from about 10 to about 40, weight percent of expandable graphite.

The expandable graphite can also be used in admixture with other expandable or nonexpandable additives. For instance expandable inorganic filler have been found to render particularly advantageous results when used in conjunction with expandable graphite. Such inorganic fillers include perlite, vermiculite, expandable glasses, micas, clay, talc, borosilicates, cokes, charcoals, hard coals, brown coals, graphite granules, cork granules, wood granules, calcium carbonate, cereal grains, cork, bark granules, expandable clay, foamed concrete, metal sponge, pumice, tuff and/or lava. In a preferred embodiment, a hydrated aluminum silicate is used, such as those commercially available which contain mostly kaolin with a relatively small amount of titanium oxide. When present, such inorganic fillers may be present in the composition of the invention prior to extrusion in an amount between from about 1 to about 50, preferably between from about 1 to about 25, weight percent.

The composition of the invention may further comprise (prior to extrusion) between from about 1 to about 25 weight percent of a surfactant. Anionic, cationic or non-ionic surfactants may be used. Exemplary non-ionic surfactants are fatty acid alkanolamides, linoleamide, tallow monoethanolamide ethoxylate, ethylene oxide adducts of a higher primary alcohol such as a nonylphenol, such as Surfonic N-85, or an ethoxylated amine as well as sorbitan monooleate, polyoxyethylene (2) oleyl ether, polyoxyethylene (20) sorbitan monooleate, a $C_9$–$C_{11}$ linear alcohol ethoxylate as well as a block copolymer of propylene and ethylene oxide, glyceryl laurate. In a preferred embodiment of the present invention, a surfactant comprising octylphenoxypolyethoxyethanol, water, and polyethylene glycol was used.

The composition of the invention further contains a defoamer. In a preferred embodiment, a non-silicone defoamer is used. The defoamer is present in the composition (prior to extrusion) in an amount generally between about 0.15 to about 10 weight percent. In a preferred embodiment of the invention, an oil-based defoamer comprising a plurality of petroleum hydrocarbons and fatty amides was used. Such defoamers include the fatty amides such as the reaction products of a (i) polyamine such as ethylene diamine, butylene diamine, diethylene triamine, triethylene tetramine, hexamethylene diamine, decamethylene diamine, hydroxyethyl ethylene diamine, and 1,3-diamine-2-propanol, and (ii) fatty acid such as those having from 6 to 18 carbon atoms.

Usual optional adjuvants can also be included within the composition of the invention. These adjuvants include reinforcing agents, process aids, stabilizers, pigments, coupling agents or a biocide. In a preferred embodiment of the invention, the composition contains less than one weight percent of a biocide such as commercially available biocides containing glycol ether and 3-iodo-2-propynyl butyl carbamate or formaldehyde.

Suitable as reinforcing agents are fibrous substances, such as polyesters, comprising less than one percent of the total composition.

A particularly desirable composition of the invention is one which contains (prior to extrusion) the following components:

| Ingredient | Approximate weight percentage range |
|---|---|
| Resinous Emulsion | 30–60 |
| Expandable graphite | 10–40 |
| Fire retardant | 10–40 |
| Surfactant | <5 |
| Remainder filler materials | Balance |

Once this mixture has been thoroughly mixed and blended, preferably in the mixing tank, the mixture is preferably extruded into thin strips to create strips of a desired thickness, width, and length. The strips may be entirely composed of the extruded material. Alternatively, in a preferred embodiment, the mixture may be extruded onto thin flexible strips composed of wax paper, mineral wool, artificial fiber ribbons such as tetrahydrofuran fibers and aromatic amide fibers, polyethylene film, polypropylene film, polyurethane film or polyester film. In the preferred method of production, the extrusion process is performed with a ram extruder also at no more than the greater of ambient or room temperature.

Once extruded, the strips are allowed to dry. Drying of the strips may occur at room temperature. Alternatively, drying of the strips may be performed through the addition of a drying agent such as Portland cement to the mixture (prior to extrusion), by chemical means (such as by the addition of crosslinking agents to the mixture prior to extrusion or by physical means, such as by microwave radiation.

When applied, the flexible intumescent device of the present invention remains dormant until the heat of a fire activates the flexible intumescent device. When activated by the heat of a fire, the flexible substrate will intumesce or similarly expand to close the gaps, cavities, or channels normally existing between each door and its respective frame in the closed position. By applying the flexible intumescent device to the outermost perimeter of each door in the preferred embodiment, the fire activated flexible intumescent device will seal off the gap between each door and frame, effectively preventing the progression of the fire.

The composition of the invention may further be easily applied by encasing the circumference of a pipe or similar conduit. The expansion of the flexible intumescent device will distance the effects of the fire and maintain the soundness of the pipe or similar conduit.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

To a polyvinyl acetate emulsion, was added octylphenoxypolyethoxyethanol and Colloid 796, a defoamer of Rhone-Poulenc. These ingredients were mixed at room temperature until homogeneous. To the resulting mixture was slowly added, while stirring, 2-amino-2-methyl-1-propanol, kaolin, ethylene diamine acid phosphate, carbon black and polyethylene terephthalate. After each of the ingredients was added the resulting mixture was stirred until homogeneous. Expandable graphite was added until a homogeneous paste was obtained. Each of the components was added as specified above at room temperature.

The resulting mixture was extruded at room temperature onto a flexible Mylar polyethylene terephthalate film. To the top surface was also applied a thin flexible protective sheath, such as a plastic strip. A slight pressure is applied and the article is allowed to dry at room temperature. Flexible intumescent strips were then cut to the desired size.

The extrudate contained about 51% of polyvinyl acetate emulsion, 0.5% octylphenoxypolyethoxyethanol, 0.4% 2-amino-2-methyl-1-propanol, 0.3% Colloid 796, 16% ethylene diamine acid phosphate, 7.5% kaolin, 22.3% expandable graphite, 0.9% polyethylene terephthalate, and 0.02% carbon black. All percentages expressed herein are weight percentage.

From the foregoing, it will be observed that numerous variations and modifications may be effected without departing from the true spirit and scope of the novel concepts of the invention.

I claim:

1. A composition, which expands on exposure to heat to form a heat insulating barrier, which comprises:
   A) from 5 to 95% by weight of expandable graphite;
   B) from 1 to 70% by weight of a $C_2$–$C_8$ alkyl diamine phosphate fire retardant;
   C) from 25 to 90% by weight of a resinous emulsion having a Tg below –40° C.

2. The composition of claim 1, further comprising from about 1 to about 50% by weight of an inorganic filler.

3. The composition of claim 2, wherein the inorganic filler is clay.

4. The composition of claim 1, further comprising from about 5 to about 50% by weight of a surfactant and about 1 to about 50% by weight of a defoamer.

5. The composition of claim 1, wherein the resin of the emulsion is selected from polyvinyl acetate, polyacrylic acid silicone, or styrene-butadiene latex.

6. The composition of claim 1, wherein the expandable graphite contains $NO_x$ or $SO_x$ prepared by the action of sulfuric or nitric acid on graphite.

7. The composition of claim 1, wherein the flame retardant is ethylene diamine acid phosphate.

8. The composition of claim 1, which comprises:
   A) from about 10 to about 40% by weight of an expandable graphite;
   B) from about 10 to about 40% by weight of a $C_2$–$C_8$ alkyl diamine phosphate;
   C) from about 1 to about 25% by weight of an inorganic filler;
   D) from about 30 to about 60% by weight of a resinous emulsion;
   E) from about 0.5 to about 30% by weight of a surfactant; and
   F) from about 0.15 to about 10% by weight of a defoaming agent.

9. A fire-retardant heat-insulating barrier comprising a flexible substrate onto which is extruded the composition of claim 1.

10. The fire-retardant heat-insulating barrier of claim 9, wherein the flexible substrate is wax paper, mineral wool, artificial fiber ribbons, polyethylene film, polypropylene film, polyurethane film or a polyester film.

11. A composition, expandable on exposure to heat to form a heat-insulating barrier, which comprises:
    A) from 5 to 95% by weight of expandable graphite;
    B) from 1 to 70% by weight of a fire retardant;
    C) from 1 to about 50% by weight of an inorganic filler dispersed in an emulsion of polyvinyl acetate or silicone.

12. The composition of claim 11, wherein the fire retardant is a phosphate.

13. The composition of claim 12, wherein the fire retardant is a $C_2$–$C_8$ alkyl diamine phosphate.

14. The composition of claim 12, wherein the flame retardant is ethylene diamine acid phosphate.

15. The composition of claim 11, wherein the inorganic filler is clay.

16. A fire-retardant heat-insulating barrier comprising a flexible substrate onto which is extruded the composition of claim 11.

17. The composition of claim 11, wherein the inorganic filler is intumescent.

18. An intumescent composition, expandable on exposure to heat to form a heat-insulating barrier, which comprises:
    A) from 5 to 95% by weight of expandable graphite;
    B) from 1 to 70% by weight of a fire retardant;
    C) from 1 to about 50% by weight of an inorganic filler dispersed in a resinous emulsion having a Tg below −40° C.

19. The composition of claim 18, wherein the resin of the emulsion is polyvinyl acetate, silicone, polyacrylic acid or styrene-butadiene latex.

20. A fire-retardant heat-insulating barrier comprising a flexible substrate onto which is extruded the composition of claim 18.

* * * * *

(12) REEXAMINATION CERTIFICATE (4815th)
United States Patent
Ackerman

(10) Number: US 6,207,085 C1
(45) Certificate Issued: Jul. 15, 2003

(54) HEAT EXPANDABLE COMPOSITIONS

(75) Inventor: Eva Ackerman, Houston, TX (US)

(73) Assignee: Rectorseal Corporation, Houston, TX (US)

Reexamination Request:
No. 90/006,163, Dec. 21, 2001

Reexamination Certificate for:
Patent No.: 6,207,085
Issued: Mar. 27, 2001
Appl. No.: 09/283,349
Filed: Mar. 31, 1999

(51) Int. Cl.$^7$ .................. C09K 21/04; C09K 21/06; C09K 21/14
(52) U.S. Cl. ................ 252/606; 252/602; 252/378 R; 252/62; 162/159; 523/179
(58) Field of Search .................... 252/606, 602, 252/378 R, 62; 162/159; 523/179; 422/179

(56) References Cited

U.S. PATENT DOCUMENTS

| | | | |
|---|---|---|---|
| 4,454,190 A | * 6/1984 | Katagiri | 428/281 |
| 4,588,523 A | 5/1986 | Tashlick et al. | 252/606 |
| 4,694,030 A | 9/1987 | von Bonin et al. | 523/179 |
| 5,232,976 A | 8/1993 | Horacek et al. | 524/495 |
| 5,942,561 A | 8/1999 | Okisaki et al. | 523/179 |
| 6,153,668 A | 11/2000 | Gestner et al. | 523/179 |

FOREIGN PATENT DOCUMENTS

EP  0 408 098  1/1991

OTHER PUBLICATIONS

"Ullmann's Encyclopedia of Industrial Chemistry VCH", vol. A23, p. 270 and 272, Weinheim (1993).
D.W. van Kreveien, "Properties of Polymers", p. 125, Elsevier Sci. Publ. Com./Amsterdam (1976).
Brandrup and Immergut, Eds., "Polymer Handbook", p. 10 (1989).
"Ullmann's Encyclopedia of Industrial Chemistry", vol. A23, p. 311 (1993).
"Encyclopedia of Polymer Science and Engineering", vol. 15, p. 281 (1985).
Kirk–Othmer "Encyclopedia of Chemical Technology", 4$^{th}$ Ed., vol. 17, p. 1054 (1996).
"Encyclopedia of Polymer Science and Engineering", vol. 2, p. 68 (1985).
"Encyclopedia of Polymer Science and Engineering", vol. 1, p. 311 (1985).

* cited by examiner

*Primary Examiner*—Joseph D. Anthony

(57) ABSTRACT

A composition which, when subjected to heat, expands to form heat-insulating barriers comprises an expandable graphite, a fire retardant, and an inorganic intumescent filler such as clay dispersed in a resinous emulsion. Particularly desirable results are obtained with a fine retardant which is a $C_2$–$C_8$ alkyl diamine phosphate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 11 and 18 are determined to be patentable as amended.

Claims 2–4, 6–10, 12–17 and 19–20, dependent on an amended claim, are determined to be patentable.

1. A *resinous emulsion* composition, which expands on exposure to heat to form a heat insulating barrier, which comprises:
   A) from 5 to 95% by weight of expandable graphite;
   B) from 1 to 70% by weight of a $C_2$–$C_8$ alkyl diamine phosphate fire retardant;
   C) from 25 to 90% by weight of a resinous emulsion having $T_g$ below –40° C.

5. The composition of claim 1, wherein the resin of the *resinous* emulsion is selected from polyvinyl acetate, silicone, polyacrylic acid, or styrene-butadiene latex.

11. A *resinous emulsion* composition, expandable on exposure to heat to form a heat-insulating barrier, which comprises:
   A) from 5 to [95%] *about 40%* by weight of expandable graphite;
   B) from 1 to 70% by weight of a fire retardant;
   C) from 1 to about 50% by weight of an inorganic filler dispersed in [an] *a resinous* emulsion of polyvinyl acetate or silicone *wherein the amount of resinous emulsion in the composition is between from about 25 to about 90 percent by weight*.

18. An intumescent *resinous emulsion* composition, expandable on exposure to heat to form a heat-insulating barrier, which comprises:
   A) from 5 [95%] *about 40%* by weight of expandable graphite;
   B) from 1 to 70% by weight of a fire retardant;
   C) from 1 to about 50% by weight of an inorganic filler dispersed in a resinous emulsion having a $T_g$ below –40° C. *wherein the amount of resinous emulsion in the composition is between from about 25 to about 90 percent by weight*.

* * * * *